Sept. 18, 1928.
N. S. HILLYARD
WIPER
Filed Oct. 28, 1927
1,684,625
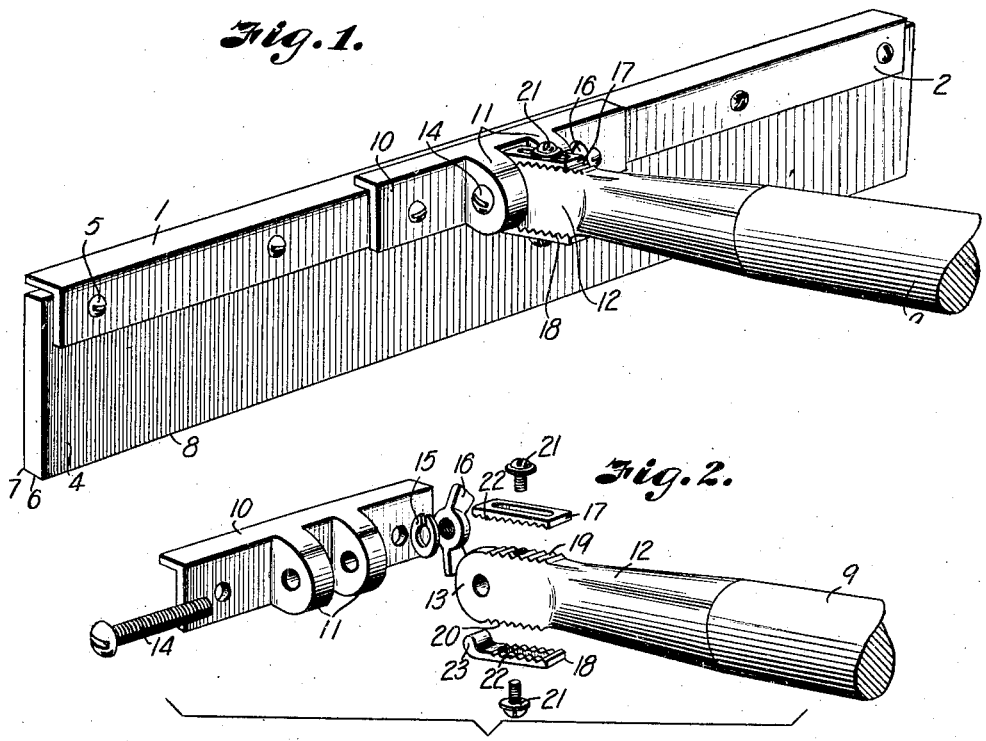
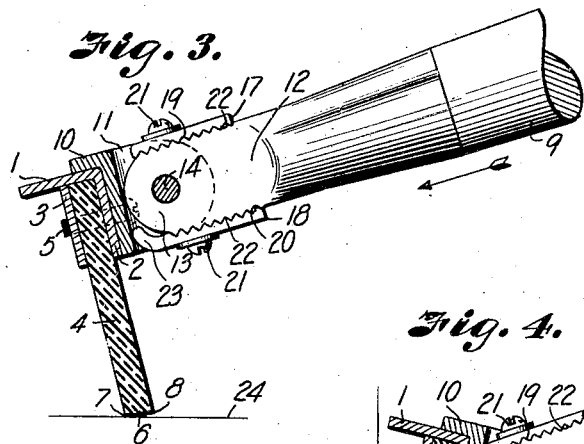
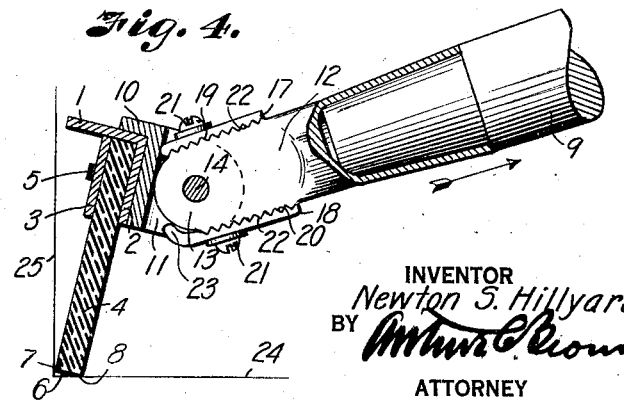
INVENTOR
Newton S. Hillyard
BY
ATTORNEY Patented Sept. 18, 1928.

1,684,625

UNITED STATES PATENT OFFICE.

NEWTON S. HILLYARD, OF ST. JOSEPH, MISSOURI.

WIPER.

Application filed October 28, 1927. Serial No. 229,453.

My invention relates to cleaners, and particularly to wipers, the principal objects of the invention being to adapt the head element for tilting, to flexibly attach a wiper head to a handle, to provide for easily effected adjustment of a wiping member to desired functioning positions, to adapt the handle to cause the wiper member to assume efficient functioning positions in relation to a surface and the handle, and to retain the wiper member removably in functioning position during an operation.

In accomplishing these and other objects of the invention I have provided improved details of structure, the preferred forms of which are illustrated in the accompanying drawings, wherein:

Fig. 1 is a perspective view of a wiping device and portion of a handle embodying my invention.

Fig. 2 is a similar view showing the elements in separated relation.

Fig. 3 is a vertical section through the wiper and head, showing the ferrule and elements for adjusting the position of the wiper in elevation.

Fig. 4 is a similar view illustrating a swab in a different position of adjustment.

Referring in detail to the drawings:

1 designates a relatively rigid head or wiper-supporting bar, illustrated as an angle bar having the depending flange 2 which cooperates with a strap or plate 3 to support a wiper element 4 laid therebetween, the flange and bar being secured together by bolts 5 to bind and retain the wiper element.

The wiper element 4 preferably consists of a flexible strip of rubber or the like substantially rectangular in cross section, whereby the lower edge 6 of the strip is provided with a forward angle or arris 7 and a rearward angle or arris 8. The wiper support is conventionally secured rigidly to a handle 9 and the edge of the element can therefore be conveniently held in only one position relative to the floor or surface to be wiped. As is well known, a flexible wiper element tends to jump or skip over the floor, with alternate engagement and release of the contacting edge with the floor, when the contacting angle is on the rear or following portion of the advancing edge. I provide, therefore, a flexible and adjustable connection between the wiper support and the handle, including a flanged yoke member 10 secured to the bar 1 having pivot-supporting ears 11, and a ferrule 12 having a rounded head 13 pivotally mounted on the ears by a pivot pin 14, the pivot pin being retained by a lock washer 15 and wing nut 16. The ferrule, bearing the handle 9, pivots freely transversely to the plane of the wiper, so that unless restraint of pivoting were provided, the wiper would be retained in functioning position only when extending in the plane of the handle, and then only for engagement of the angle 8 with the surface to be wiped.

Means for limiting the relative pivoting of the ferrule or handle, and the wiper support, comprise slotted stop plates 17 and 18, which may be positioned respectively longitudinally on the upper and lower notched surfaces 19 and 20 of the head portion of the ferrule and removably secured thereto by screws 21. The plates are provided with teeth 22 engageable with the notched ferrule surfaces, for more secure engagement therewith in selected positions. The plate 18, which is adapted for association with the lower surface of the ferrule, is preferably provided with an arcuate extension or lip 23 that may overlie the outer end of the ferrule and extend between the longitudinal axis of the ferrule and a tangent of the head parallel thereto, to engage the pivot-supporting member 10 and restrain the wiper in a slight degree of anti-clockwise pivoting. The plates are adjustable to provide a range of pivotal movement, or for fixing the ferrule in immovable engagement with the wiper support.

The elements having been provided as described, the ferrule pivotally mounted on the supporting bar for operation of the cleaner by the handle, the stop members are adjusted for normal operation as illustrated in Figs. 3 and 4, with the outer end of the upper stop plate spaced inwardly from a tangent on the outer end of the rounded head perpendicular to the longitudinal axis of the ferrule, and the lip of the lower stop plate substantially contacting said tangent. In this position, the lower stop plate, engaging the supporting member 10, restrains the anti-clockwise pivoting of the wiper support so that the wiper lies in a plane substantially at right angles to the handle, whereby when the handle is held at a suitable operating angle the forward arris or angle of the lower edge of the wiper is in contact with a floor or other surface 24, for effective wiping of the surface upon pushing operation of the handle, Fig. 3, there being no adjacent vertical obstacles to interfere with the positioning or movement of the wiper edge.

When it is desired to operate the cleaner by opposite movement of the handle, for example in wiping an area adjacent the receding angle formed by a wall 25 and the floor 24, the wiper-supporting angle bar 1, engaging the wall, prevents the suitable positioning of the wiper element. The wiper, therefore, is swung on its pivot to the position illustrated in Fig. 4, and is restrained in such position, for functioning upon retractive movement of the handle, by the support member 10 bearing against the upper stop plate. In this position, the wiper support and the pivot-supporting bar are spaced from the vertical obstacle, namely the wall 25 to permit the lower edge of the angularly inclined wiper to enter the receding angle; and the rearward angle or arris of the wiper edge is in contact with the surface for effective operation by the wiper under rearward movement thereof over the surface.

The wiper, being free to tilt on its pivotal support, is therefore automatically positioned for effective swabbing, by the operation of the handle that sets the wiper edge in swabbing location; and pushing or pulling accompanied by depressing, causes the pivoting of the wiper to engage the suitable edge arris, the continuation of the pushing or pulling motion causing the wiper to move in the direction for effective wiping by the wiper edge so positioned. Jumping or skipping of the wiper is avoided, since the contacting angle of the wiper edge is the advance angle in whichever direction the wiper edge may be moved.

The stop plates may be adjusted longitudinally of the ferrule, each in more or less advanced position, to stop the wiper support at a desired degree of either clockwise or anti-clockwise pivoting. Both of the stop plates may be advanced and latched in advanced position, to latch the members against pivoting and so provide a rigid connection between the ferrule and the wiper support.

What I claim and desire to secure by Letters Patent is:

1. In a cleaner having a wiper-supporting head, a ferrule pivotally connected with the head, and adjustable members independently movable longitudinally on the ferrule and alternately engageable with the head upon opposite pivoting of the ferrule for limiting the pivoting of the ferrule on the member.

2. In a cleaner having a rigid wiper-supporting bar, a freely oscillating ferrule pivotally connected with the bar and having a notched face, and a notched plate adjustably engaged with said notched face and engageable with said bar upon pivoting of the ferrule for controlling the pivotal range of the ferrule.

3. In a cleaner having a flexible wiper member and a rigid wiper-supporting bar, a ferrule pivotally connected with the bar and having notched upper and lower faces, and notched plates adjustably secured to said notched faces and having end portions respectively engageable with said bar upon opposite pivotal movements of the ferrule for arresting the pivotal movement of the ferrule.

4. In combination with a cleaner having a rigid wiper-supporting bar, a ferrule pivotally connected with the bar and having plate-receiving upper and lower faces, and slotted plates longitudinally movable and adjustably fixed to said ferrule faces and comprising stop members, portions of said bar being engageable with said stop members upon pivoting of the ferrule for controlling the pivotal movement of the ferrule.

5. In a cleaner, the combination with a flexible wiper member having a substantially rectangular surface-engaging edge, and a wiper-supporting bar, a ferrule freely pivotal on the bar, and adjustable means connected with the ferrule and engageable with the bar upon pivoting of the ferrule for retaining the arris of the advancing side of the wiper in service position and in engagement with the surface being wiped.

6. In a wiper, the combination with a wiper-supporting bar and a ferrule, of a yoke member fixed to the bar, the ferrule being pivotally supported by said yoke, and arresting members movably secured to the ferrule and alternately engageable with the bar upon pivoting of the ferrule for cooperation to limit the pivoting of the ferrule for restraining the bar in a desired tilted position of the wiper, one of said members having an arcuate lip extending forwardly against said bar.

7. In a cleaner, a ferrule member and a freely oscillating head member pivotally connected with the ferrule member, and means adjustable longitudinally of the ferrule and fixable thereto for engaging the head member to arrest the oscillation of the head member in one direction.

In testimony whereof I affix my signature.

NEWTON S. HILLYARD.